United States Patent [19]

Nakane

[11] Patent Number: 4,937,803
[45] Date of Patent: Jun. 26, 1990

[54] TRACK ACQUISITION APPARATUS AND METHOD WITH SPECIFIED VELOCITY PATTERN

[75] Inventor: Hiroshi Nakane, Kanagawa, Japan

[73] Assignee: Kabushiki Kaisha Toshiba, Kanagawa, Japan

[21] Appl. No.: 257,573

[22] Filed: Oct. 14, 1988

[30] Foreign Application Priority Data

Oct. 15, 1987 [JP] Japan .............................. 62-260165

[51] Int. Cl.$^5$ .......................................... G11B 21/08
[52] U.S. Cl. ..................................... 369/32; 369/43; 360/73.03; 360/78.06
[58] Field of Search ................... 369/32; 358/907, 342; 360/78.01, 78.04, 78.06, 73.03

[56] References Cited

U.S. PATENT DOCUMENTS

| 4,030,132 | 6/1977 | Iftikar et al. | 360/78.06 |
| 4,321,517 | 3/1982 | Touchton et al. | 360/78.04 X |
| 4,677,507 | 6/1987 | Elliott | 360/78.07 |
| 4,748,607 | 5/1988 | Nakane | 369/32 |

Primary Examiner—Robert L. Richardson

Attorney, Agent, or Firm—Finnegan, Henderson, Farabow, Garrett and Dunner

[57] ABSTRACT

A data reading device for use in a disc player including a pickup device for reading data from a disc, a pickup transfer motor for moving the pickup across the disc in a radial direction in response to a speed control signal, a pickup transfer speed detector for detecting the radial speed of the pickup and generating a speed signal representative of the speed, a target position signal generator for generating a position signal corresponding to a desired radial position on the disc, a microcomputer for calculating the location of the pickup with respect to the disc and generating a location signal corresponding to the location, a comparator for generating a distance signal representing the distance between the location of the pickup and the desired position using the position signal and the location signal, nonlinear attenuator for attenuating the speed signal in a nonlinear manner based upon the value of the speed signal and a pickup drive circuit for generating the speed control signal from the distance signal and the attenuated speed signal and applying the speed control signal to the pickup transfer motor for moving the pickup.

12 Claims, 6 Drawing Sheets

TRACK ACQUISITION APPARATUS AND METHOD WITH SPECIFIED VELOCITY PATTERN

FIELD OF THE INVENTION

The present invention relates generally to a data reading device for use in a disc player, and more particularly, to a track jump servo system for a disc player having servos for positioning a pickup means to a desired data location on a disc-shape information carrier.

BACKGROUND OF THE INVENTION

Digital record discs for recording information signals such as digitized audio signals, video or image signals have become quite common, as have record disc reproducing apparatus for reproducing the recorded information data. Further, some digital record discs, e.g., so-called CDs (Compact Discs) have recently become used as ROM (Read Only Memory) devices for computers, so-called CD-ROMs.

On such a digital record disc, digital data intended for high density recording are recorded in the form of a spiral bit string on one side thereof and reproduced through reading the bit string by means of pickup means such as an optical pickup using laser beams. The optical pickup of the record disc reproducing apparatus follows the bit string by means of a tracking control system. CD players or video disc players are further used to process the read-out signal in a predetermined manner so as to convert the signal into a replica of the original analog form signal which was recorded, i.e., an audio or video signal, as an output.

As is well known, address information may also be recorded on the record disc which may be detected for a data search or a track jump operation, so that reproduction at a desired track location can be easily and quickly achieved. In particular, a selected address corresponding to the desired track location is preset, and the pickup is rapidly moved across or transverse to the disc tracks until the target track corresponding to the selected address is reached. During such a data search operation, the distance that the pickup should jump or transverse tracks is calculated by, for example, a microcomputer in accordance with the address of the track at which the pickup is presently located and the address of the target track. Then the pickup is moved that distance radially across the tracks of the disc by applying a pickup transfer drive voltage to a pickup transfer motor such as a linear motor. The pickup transfer drive voltage causes the pickup to move across or transverse tracks until the pickup transfer drive voltage ceases.

Conventionally, data reading devices such as CD-ROM drivers, CD players, etc., are provided with an information data search operation system to quickly read out a desired information signal recorded on a disc such as a CD or a CD-ROM. The search operation is realized by moving a pickup in the radial direction of the disc to the location of desired information to be read out. That is, the search operation is carried out by a so-called track jump movement in which the pickup jumps across or transverse a number of tracks.

Figure 1:
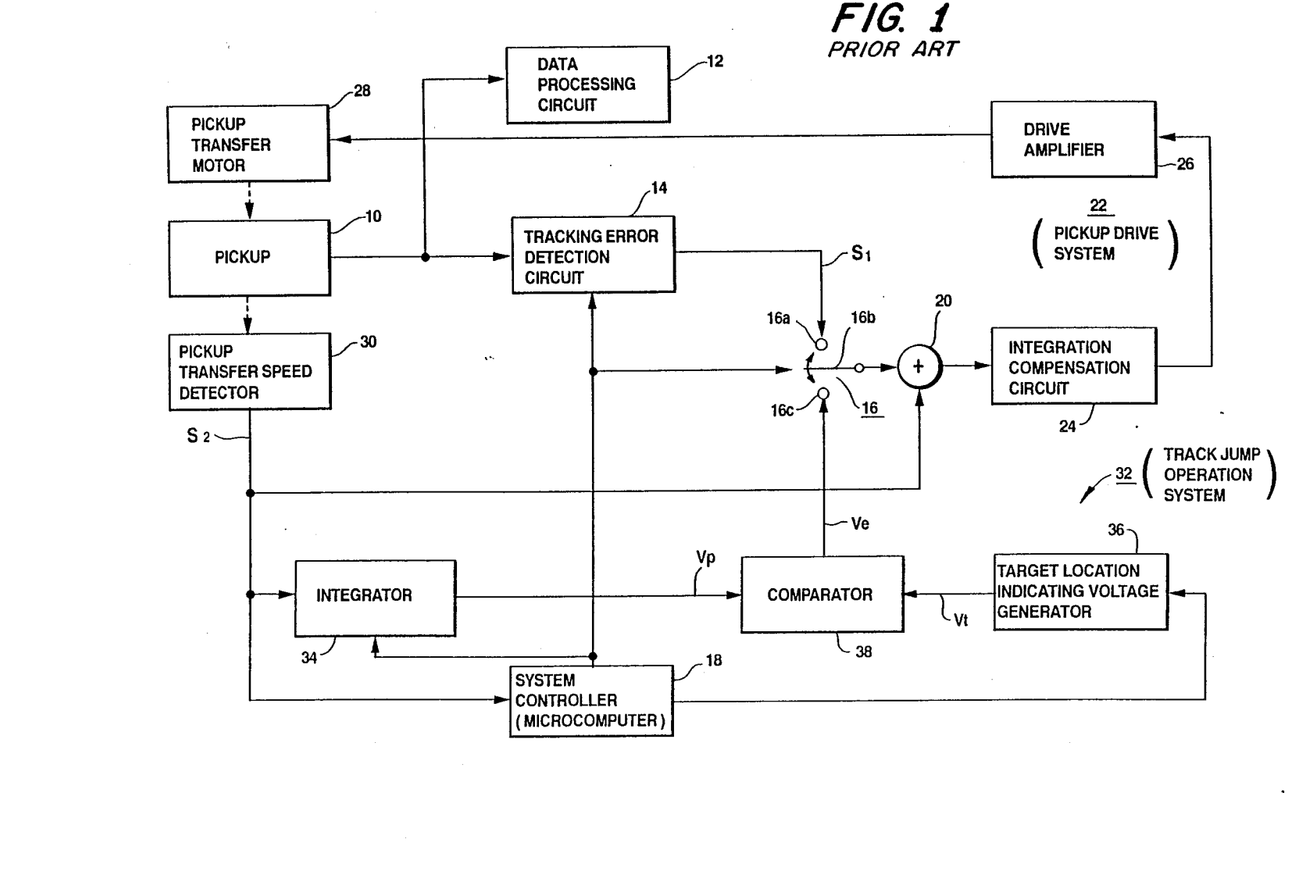
FIG. 1 is a block diagram showing a conventional data reading device for use of a disc player.

Referring now to FIG. 1, a conventional data reading device will be described in brief. FIG. 1 is a block diagram showing the conventional data reading device for a disc player. In FIG. 1, a pickup 10 is provided for optically reading out data from a disc (not shown) such as a CD or a CD-ROM. The pickup 10 comprises an optical system such as a laser beam source, an objetive lens, a phototransducer, etc. and a mechanical system such as a lens support for movably supporting the objective lens in the pickup 10.

The pickup 10 outputs a signal responding to an optical signal applied from the disc to the pickup 10. The output signal is applied to a data processing circuit 12 and a tracking error detection circuit 14. The tracking error detection circuit 14 generates a tracking error singal $S_1$. The tracking error singal $S_1$ is obtained in response to a deviation of the pickup 10 from the center of a record track. The tracking error singal $S_1$ is applied to a first fixed terminal 16a of a mode switch 16.

In the data reading mode, a movable terminal 16b of the mode switch 16 is connected to the first fixed terminal 16a under the control of a system controller 18 such as a microcomputer. Thus, the tracking error singal $S_1$ is applied to an adder 20. The adder 20 is provided for introducing the tracking error singal $S_1$ and a pickup transfer speed signal $S_2$, which will be described later, into the same circuit. The tracking error singal $S_1$ and the pickup transfer speed signal $S_2$ are applied to both a pickup drive system 22 and an objective lens drive system (not shown). The objective lens drive system moves the objective lens in the direction across or transverse the tracks. Thus, a tracking servo for the pickup 10 is carried out.

The pickup drive system 22 comprises an integration compensation circuit 24, a drive amplifier 26 and a pickup transfer motor 28. The integration compensation circuit 24 compensates the tracking error singal $S_1$ and the pickup transfer speed signal $S_2$ so that some influences in the tracking error singal $S_1$ and the pickup transfer speed signal $S_2$ caused by nonlinearity of the mechanical system are reduced. The tracking error singal $S_1$ and the pickup transfer speed signal $S_2$ are applied to the pickup transfer motor 28 through the drive amplifier 26. Thus, the pickup transfer motor 22 gradually moves the pickup 10 in the direction toward the periphery of the disc to follow the spiral track of the disc.

The data reading device further comprises a pickup transfer speed detector 30 such as a frequency generator. The pickup transfer speed detector 30 is associated with the pickup 10 for generating the pickup transfer speed signal $S_2$ responding to the transfer speed of the pickup 10. The pickup transfer speed signal $S_2$ is introduced into the pickup drive system 22 through the adder 20. The pickup transfer speed signal $S_2$ operates to dump the movement of the pickup transfer motor 28, in the servo control manner. Thus, the movement of the pickup 10 is stabilized.

Further, the data reading device comprises a track jump operation system 32 for carrying out the search operation. The track jump operation system 32 comprises the pickup transfer speed detector 30, an integrator 34, a target location indicating voltage generator 36, a comparator 38 and the system controller 18.

When an operation for searching a specific data to be read is commanded, the data reading device is changed from the data reading mode by the system controller 18.

In the search operation mode, the system controller 18 turns the movable terminal 16b of the mode switch 16 to the second fixed terminal 16c. Further the system controller 18 activates the integrator 34 so that the content of the integrator 34 is initialized. The system controller 18 further decides a transfer direction of the pickup 10 by judging whether the specific data to be read is located on a track position inner or outer than the present location of the pickup 10.

The integrator 34 is associated with the pickup transfer speed detector 30 for integrating the pickup transfer speed signal $S_2$ applied from the pickup transfer speed detector 30. Thus, the integrator 34 outputs an integration voltage Vp. The integration voltage Vp output from the integrator 34 increases in response to the progress of movement of the pickup 10.

The system controller 18, e.g., the microcomputor calculates a distance between the present location of the pickup 10 and the target location of the specific data to be read. Then, the system controller 18 sets a target location indicating voltage Vt in the target location indicating voltage generator 36.

Both the integration voltage Vp output from the integrator 34 and the target location indicating voltage Vt generated from the target location indicating voltage generator 36 are applied to the comparator 38. The comparator 38 compares the integration voltage Vp with the target location indicating voltage Vt. Thus, an error voltage Ve corresponding to the difference between the voltages Vp and Vt is output from the comparator 38. The error voltage Ve is introduced into the pickup drive system 22 through the mode switch 16. The error voltage Ve drives the pickup transfer motor 28 so that the pickup 10 moves or jumps across the tracks toward the target location of the specific data to be read.

When the pickup 10 reaches the target location, the integration voltage Vp increases to the value almost the same as the target location indicating voltage Vt (Vp=Vt). Then, the error voltage Ve from the comparator 38 is eliminated to the zero voltage so that the movement of the pickup 10 finishes and the data search operation is completed. In response to the completion of the data search operation, the system controller 18 turns the data reading device to the data reading mode.

In the data search operation mode, the pickup transfer speed signal $S_2$ is also introduced into the pickup drive system 22 through the adder 20. The pickup transfer speed signal $S_2$ operates to dump the movement of the pickup transfer motor 28 in the negative feedback manner, in similar to the operation in the data reading mode. Thus, the pickup 10 is settled to the target track without overruning the target track. If the pickup transfer speed signal $S_2$ is not introduced into the pickup drive system 22 in the data search operation, the pickup 10 is apt to overruning the target track. When such an overruning occurs, the pickup 10 approaches the target track through an oscillatory movement across the target track. Thus, the data search operation takes a long time period. Furthermore, if the target location of the specific data to be read is near to the periphery of the disc, the pickup 10 easily goes to the outside of the disc. When such overrun of the pickup 10 has occurred, the focus servo will be no longer carried out for the optical system in the pickup 10. As a result, the data reading operation becomes impossible or an enormous time will be required for restoration of the data reading operation.

The pickup transfer speed signal $S_2$ introduced into the pickup drive system 22 prevents such an inconvenience. However, the conventional data reading device still has some drawbacks as described below.

The pickup transfer speed signal $S_2$ is used for dumping the movement of the pickup 10 in the servo control manner. As a result, the pickup 10 can stably follow the track in the data reading mode. In the data search mode, the pickup 10 can be settled on the target track without overruning the target track. However, the pickup 10 can not reach rapidly the target track. This is because a relatively large value of the pickup transfer speed signal $S_2$ is always applied to the pickup drive system 22 during the data search operation, especially at the beginning of the data search operation. The large value of the pickup transfer speed signal $S_2$ excessively dumps the movement of the pickup 10. Thus, the transfer speed of the pickup 10 toward the target track is reduced. This causes that the data search operation to take a long time.

SUMMARY OF THE INVENTION

Accordingly, it is an object of the present invention to provide a data reading device for use in a disc player which is capable of rapidly and accurately accessing a desired data or information record track on a disc-shape information carrier.

It is another object of the present invention to provide a track jump servo system for positioning a pickup means rapidly and accurately to a desired data location on a disc-shape information carrier.

It is still another object of the present invention to provide a track jump servo system for disc players which is able to avoid the above-described difficulties encountered with the prior art.

These and other objects of the present invention are achieved in the data reading device for use in a disc player which includes a pickup device for reading data from a disc, a pickup transfer motor for moving the pickup across the disc in a radial direction in response to to a speed control signal, a pickup transfer speed detector for detecting the radial speed of the pickup and generating a speed signal representative of the speed, a target position signal generator for generating a position signal corresponding to a desired radial position on the disc, a microcomputer for calculating the location of the pickup with respect to the disc and generating a location signal corresponding to the location, a comparator for generating a distance signal representing the distance between the location of the pickup and the desired position using the position signal and the location signal, nonlinear attenuator for attenuating the speed signal in a nonlinear manner based upon the value of the speed signal and a pickup drive circuit for generating the speed control signal from the distance signal and the attenuated speed signal and applying the speed control signal to the pickup transfer motor for moving the pickup.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will now be described in detail with reference to FIGS. 2 through 6. Throughout the drawings, like reference numerals or letters used in FIG. 1 (Prior Art) will be used to designate like or equivalent elements for simplicity of explanation.

Figure 2:
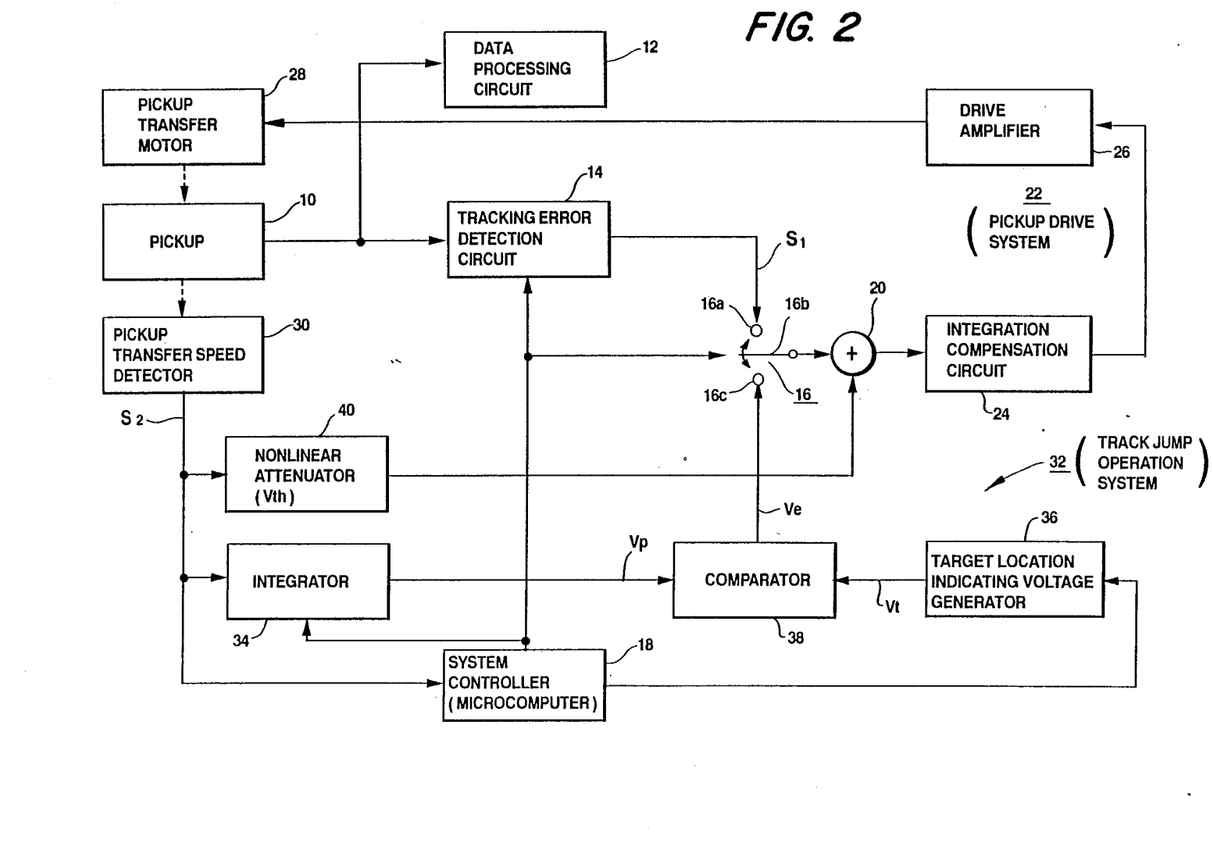
FIG. 2 is a block diagram showing a first embodiment of a data reading device for use of a disc player according to the present invention.
Figure 3:
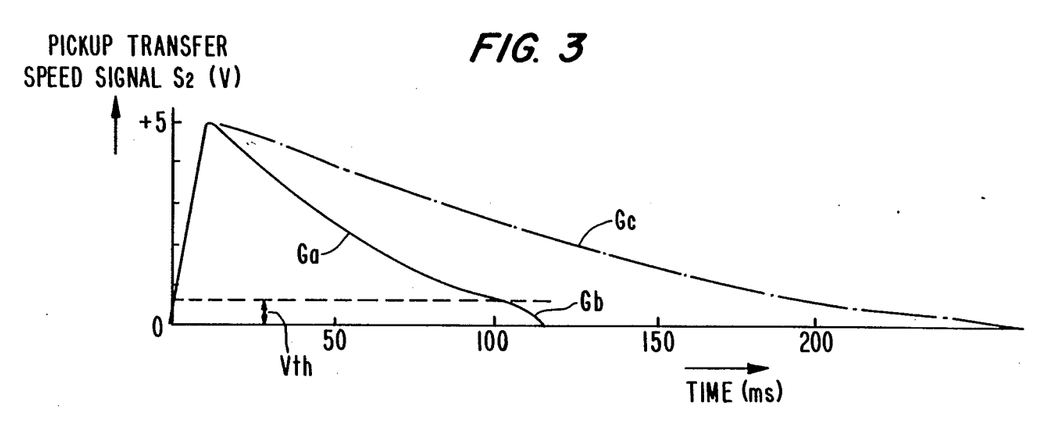
FIG. 3 is a graph showing a transfer speed of the pickup of the data reading device of FIG. 2 in the data search operation.
Figure 4:
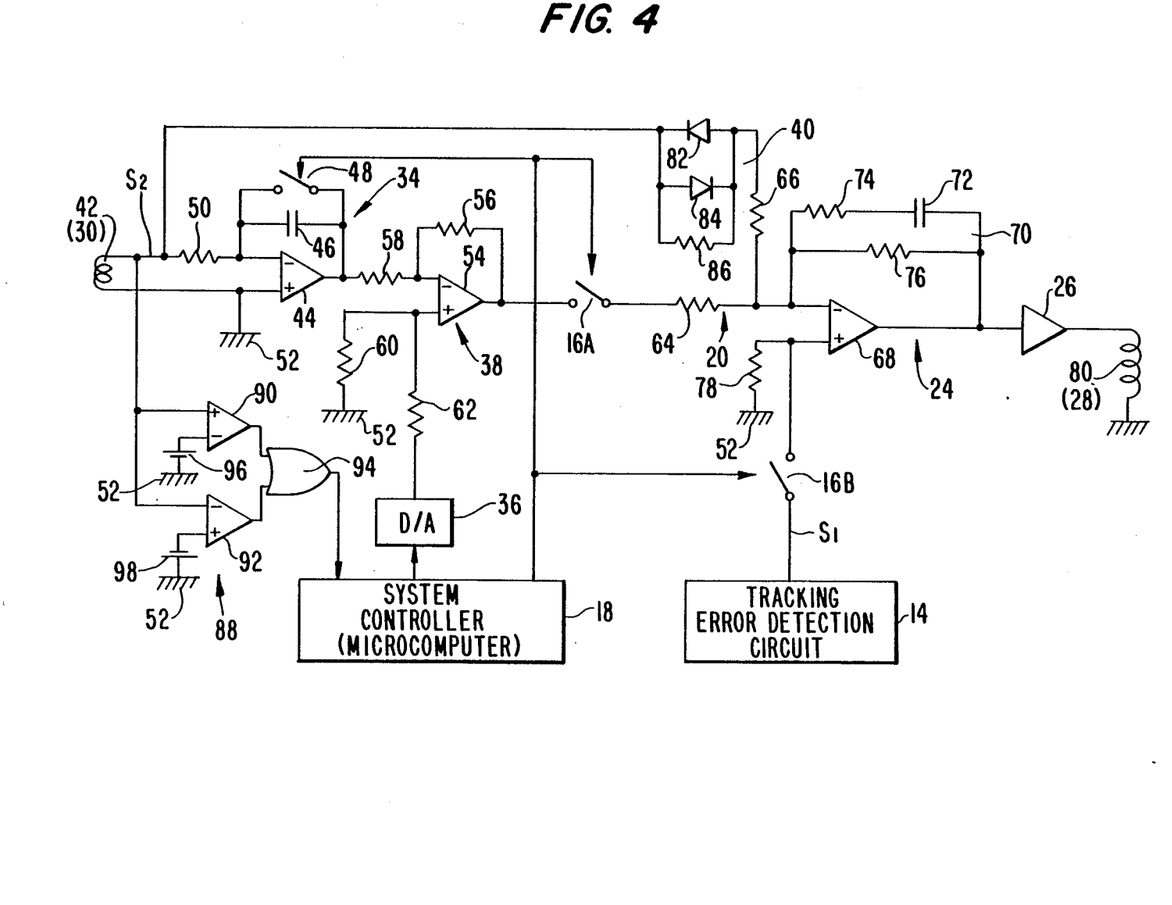
FIG. 4 is a schematic circuit diagram showing a practical circuit arrangement for a part of the data reading device of FIG. 2, which is assigned for the data search operation.

Referring now to FIGS. 2, 3 and 4, a first embodiment of a data reading device for a disc player according to the present invention will be described. FIG. 2 is a block diagram showing the first embodiment of a data reading device. FIG. 3 is a graph showing a transfer speed of the pickup of the data reading device of FIG. 2 in the data search operation, in comparison to that of the conventional device. FIG. 4 is a diagram showing the practical circuit arrangement embodying a part of the data reading device of FIG. 2, which is assigned for the data search operation.

In FIG. 2, a pickup 10 is provided for optically reading out data from a disc (not shown) such as a CD or a CD-ROM. The pickup 10 comprises an optical system such as a laser beam source, an objective lens, a photo-transducer, etc. and a mechanical system such as a lens support for movably supporting the objective lens in the pickup 10.

The pickup 10 outputs a signal responding to an optical signal applied from the disc to the pickup 10. The output signal is applied to a data processing circuit 12 and a tracking error detection circuit 14. The tracking error detection circuit 14 generates a tracking error singal $S_1$. The tracking error singal $S_1$ is obtained in response to a deviation of the pickup 10 from the center of a record track. The tracking error singal $S_1$ is applied to a first fixed terminal 16a of a mode switch 16.

In the data reading mode, a movable terminal 16b of the mode switch 16 is connected to the first fixed terminal 16a under the control of a system controller 18 such as a microcomputer. Thus, the tracking error singal $S_1$ is applied to an adder 20. The adder 20 is provided for introducing the tracking error singal $S_1$ and a pickup transfer speed signal $S_2$, which will be described later, into the same circuit. The tracking error singal $S_1$ and the pickup transfer speed signal $S_2$ are applied to both a pickup drive system 22 and an objective lens drive system (not shown). The objective lens drive system moves the objective lens in the direction across or transverse the tracks. Thus, a tracking servo for the pickup 10 is carried out.

The pickup drive system 22 comprises an integration compensation circuit 24, a drive amplifier 26 and a pickup transfer motor 28. The integration compensation circuit 24 compensates the tracking error singal $S_1$ and the pickup transfer speed signal $S_2$ so that some undesired influences in the tracking error singal $S_1$ and the pickup transfer speed signal $S_2$ caused by nonlinearity of the mechanical system are reduced. The tracking error singal $S_1$ and the pickup transfer speed signal $S_2$ are applied to the pickup transfer motor 28 through the drive amplifier 26. Thus, the pickup transfer motor 22 gradually moves the pickup 10 in the direction toward the periphery of the disc to follow the spiral track of the disc.

The data reading device further comprises a pickup transfer speed detector 30 such as a frequency generator. The pickup transfer speed detector 30 is associated with the pickup 10 for generating the pickup transfer speed signal $S_2$ responding to the transfer speed of the pickup 10. The pickup transfer speed signal $S_2$ is applied to a nonlinear attenuator 40.

The nonlinear attenuator 40 has a prescribed threshold level Vth of voltage for the attenuation. When the voltage level of the pickup transfer speed signal $S_2$ is lower than the threshold level Vth, the nonlinear attenuator 40 transmits the pickup transfer speed signal $S_2$ therethrough with a small degree of attenuation or no attenuation. On the other hand, the nonlinear attenuator 40 sharply attenuates the pickup transfer speed signal $S_2$, when the voltage level of the pickup transfer speed signal $S_2$ is higher than the threshold level Vth. The pickup transfer speed signal $S_2$ passing through the nonlinear attenuator 40 is then introduced into the pickup drive system 22 through the adder 20.

In the data reading mode, the pickup 10 is servo controlled to follow the track under the control of the tracking error signal $S_1$, as described before. Thus, the pickup transfer speed detector 30 generates a pickup transfer speed signal $S_2$ of small value, which signal is very much lower than the threshold level Vth. The low level pickup transfer speed signal $S_2$ passes through the nonlinear attenuator 40 without being attenuated by the nonlinear attenuator 40. Thus, the data reading device according to the present invention carries out the data reading operation almost the same as that of carried out by the conventional data reading device, as shown in FIG. 1. That is, the tracking movement of the pickup 10 is effectively dumped by the sufficient amount of the pickup transfer speed signal $S_2$. This results the pickup 10 stably following the subject track.

Further, the data reading device comprises a track jump operation system 32 for carrying out the data search operation. The track jump operation system 32 comprises the pickup transfer speed detector 30, an integrator 34, a target location indicating voltage generator 36, a comparator 38 and the system controller 18.

When an operation for searching for specific data to be read is commanded, the data reading device is changed from the data reading mode by the system controller 18.

In the search operation mode, the system controller 18 turns the movable terminal 16b of the mode switch 16 to the second fixed terminal 16c. Further the system controller 18 activates the integrator 34 so that the content of the integrator 34 is initialized. The system controller 18 further decides a transfer direction of the pickup 10 by judging whether the specific data to be read is located on a track position inside or outside of the present location of the pickup 10.

The integrator 34 is associated with the pickup transfer speed detector 30 for integrating the pickup transfer speed signal $S_2$ applied from the pickup transfer speed detector 30. The integrator 34 outputs an integration voltage Vp. The integration voltage Vp output from the integrator 34 increases in response to the progress of movement of the pickup 10.

The system controller 18, e.g., the microcomputor, calculates a distance between the present location of the pickup 10 and the target location of the specific data to be read. Then, the system controller 18 sets a target location indicating voltage Vt in the target location indicating voltage generator 36.

Both the integration voltage Vp output from the integrator 34 and the target location indicating voltage Vt generated from the target location indicating voltage generator 36 are applied to the comparator 38. The comparator 38 compares the integration voltage Vp with the target location indicating voltage Vt. Thus, an error voltage Ve corresponding to the difference between the voltages Vp and Vt is output from the comparator 38. The error voltage Ve is introduced in to the pickup drive system 22 through the mode switch 16. The error voltage Ve drives the pickup transfer motor 28 so that the pickup 10 moves or jumps across the tracks toward the target location of the specific data to be read.

When the pickup 10 reaches the target location, the integration voltage Vp increases to a value almost the same as the target location indicating voltage Vt (Vp=Vt). Then, the error voltage Ve from the comparator 38 is reduced to zero so that the movement of the pickup 10 stops and the data search operation is completed. In response to the completion of the data search operation, the system controller 18 turns the data reading device to the data reading mode.

In the data search operation mode, the pickup transfer speed signal $S_2$ is also introduced into the pickup drive system 22 through the nonlinear attenuator 40 and the adder 20. When the voltage level of the pickup transfer speed signal $S_2$ is lower than the threshold level Vth, the nonlinear attenuator 40 transmits the pickup transfer speed signal $S_2$ therethrough with a small attenuation or no attenuation, as described above. On the other hand, the nonlinear attenuator 40 sharply attenuates the pickup transfer speed signal $S_2$, when the voltage level of the pickup transfer speed signal $S_2$ is higher than the threshold level Vth. The pickup transfer speed signal $S_2$ passing through the nonlinear attenuator 40 is then introduced into the pickup drive system 22 through the adder 20.

The pickup transfer speed signal $S_2$ introduced into the pickup drive system 22 operates to dump the transfer movement of the pickup 10, in the manner similar to the operation in the data reading mode.

At the beginning of the data search operation, the error voltage Ve with a relatively high voltage in response to the distance between the location of the pickup 10 at the beginning of the data search operation and the target location is introduced into the pickup drive system 22. The high level error voltage Ve causes the pickup 10 to move at a relatively high speed toward the target track. Thus, the pickup transfer speed signal $S_2$ with a voltage higher than the threshold level Vth of the nonlinear attenuator 40 is detected from the pickup transfer speed detector 30. However, the high level pickup transfer speed signal $S_2$ is greatly attenuated by the nonlinear attenuator 40. The attenuated pickup transfer speed signal $S_2$ is then introduced into the pickup drive system 22. As a result, the pickup transfer motor 28 in the pickup drive system 22 can rapidly move the pickup 10 toward the target location of the specific data to be read.

When the data search operation progresses favorably, the integration voltage Vp output from the integrator 34 gradually increases so that the error voltage Ve output from the comparator 38 also gradually decreases. The decreased error voltage Ve introduced into the pickup drive system 22 reduces the transfer speed of the pickup 10. The pickup transfer speed signal $S_2$ output from the pickup transfer speed signal detector 30 decreases in response to the transfer speed of the pickup 10. When the pickup 10 reaches a position close to the target track at a prescribed extent, the pickup transfer speed signal $S_2$ becomes lower than the threshold voltage Vth. The low level pickup transfer speed signal $S_2$ passes through the nonlinear attenuator 40 with the small attenuation or no attenuation. Thus, the sufficient amount of the low level pickup transfer speed signal $S_2$ is introduced into the pickup drive system 22, when the pickup 10 has reached to the position close to the target track. The non-attenuated pickup transfer speed signal $S_2$ operates to sufficiently dump the transfer movement of the pickup 10. Thus, the pickup 10 is rapidly settled to the target track without overrunning the target track.

Referring now to FIG. 3, the operation of the nonlinear attenuator 40 will be described. FIG. 3 is a graph showing the pickup transfer speed signal $S_2$ of the data reading device of FIG. 2 in the data search operation. As shown in FIG. 3, the pickup transfer speed signal $S_2$ presents a very high voltage of about 5 volts at the beginning of the track jump operation in response to the distance that the pickup 10 must jump. The high level pickup transfer speed signal $S_2$ strongly accelerates the pickup 10 so that the pickup 10 rapidly moves toward the target data location. When the data search operation progresses favorably, the error voltage Ve introduced into the pickup drive system 22 gradually decreases. Thus, the the pickup transfer speed signal $S_2$ gradually decreases, as shown by the graph portion Ga in FIG. 3. When the pickup transfer speed signal $S_2$ decreases below the threshold voltage Vth, the transfer speed of the pickup 10 is rapidly dumped. The pickup transfer speed signal $S_2$ rapidly decreases, as shown by the graph portion Gb in FIG. 3.

In FIG. 3, the graph portion Gc shows the variation characteristics of the pickup transfer speed signal $S_2$ in the conventional data reading device (see FIG. 1). As is easily understood from the graphs in FIG. 3, the data reading device of the present invention can rapidly move the pickup 10 to the target track in comparison to the conventional data reading device.

As described above, the pickup 10 is rapidly moved toward the specific data location to be read, at the beginning of the data search operation. Further, the transfer speed of the pickup 10 is effectively dumped when the pickup 10 approaches to the specific data location to be read. Thus, the pickup 10 is accurately positioned by the data search system 32. Further, the pickup 10 is prevented from running outside the outer perimeter of the disc and the rapid and accurate track jump operation to the target location is performed.

Referring now to FIG. 4, a practical circuit arrangement of the data reading device of FIG. 2 will be explained. FIG. 4 is a schematic circuit diagram showing a practical circuit arrangement for a part of the data reading device of FIG. 2, which is assigned for the data search operation.

In FIG. 4, the pickup transfer speed detector 30 comprises a detection coil 42. The pickup transfer speed signal $S_2$ is generated in the detection coil 42. The pickup transfer speed signal $S_2$ is applied to both the integrator 34 and the nonlinear attenuator 40. The integrator 34 comprises a first operational amplifier 44, a capacitor 46 coupled across the inverse input terminal and the output terminal of the first operational amplifier 44 and an integrator switch 48 coupled in parallel with the capacitor 46. The inverse input terminal of the first operational amplifier 44 is coupled to the detection coil 42 through a resistor 50. The non-inverse input terminal of the first operational amplifier 44 is coupled to a reference potential source 52.

The switch 46 is turned OFF by the system controller 18 in the data search or track jump operation. When the data search operation finishes, the integrator switch 48 is turned ON. Thus, the integrator 34 is reset so that the content of the integrator 34 is initialized.

The pickup transfer speed signal $S_2$ is applied to the inverse input terminal of the first operational amplifier 44 through the resistor 50. The pickup transfer speed signal $S_2$ is charged in the capacitor 46 so that the integrated voltage Vp is obtained from the output of the integrator 34.

The integration voltage Vp is applied to the comparator 38. The comparator 38 comprises a second operational amplifier 54 and a feedback resistor 56 coupled across the inverse input terminal and the output terminal of the second operational amplifier 54. The inverse input terminal of the second operational amplifier 54 is coupled to the output terminal of the integrator 34 through a resistor 58. The non-inverse input terminal of the second operational amplifier 54 is coupled to both the reference potential source 52 and the target location indicating voltage generator 36. The non-inverse input terminal and the reference potential source 52 are coupled to each other through a resistor 60. The non-inverse input terminal and the target location indicating voltage generator 36 are coupled to each other through a resistor 62. Thus, the integration voltage Vp is compared with the target location indicating voltage Vt applied from the target location indicating voltage generator 36 in the comparator 38.

The output of the comparator 38, i.e., the error voltage Ve obtained by the comparator 38 is applied to the mode switch 16. The mode switch 16 is divided to two unit switches 16A and 16B. Then, the error voltage Ve is applied to the first unit switch 16A. The first unit switch 16A is turned ON in the data search operation by the system controller 18. While, the second unit switch 16B is turned OFF in the data search mode by the system controller 18, as described later.

The error voltage Ve passing through the first unit switch 16A is introduced into the pickup drive system 22 through the adder 20. The adder 20 comprises a pair of adder resistors 64 and 66, which are coupled to each other with their respective one ends. The first adder resistor 64 is coupled between the first unit switch 16A and the pickup drive system 22. The second adder resistor 66 is coupled between the nonlinear attenuator 40 and the pickup drive system 22.

The error voltage Ve passing through the adder 20 is applied to the integration compensation circuit 24 in the pickup drive system 22. The integration compensation circuit 24 comprises a third operational amplifier 68 and a feedback network 70 coupled across the inverse input terminal and the output terminal of the third operational amplifier 68. The feedback network 70 comprises a feedback capacitor 72 and a pair of feedback resistors 74 and 76. The feedback capacitor 72 and the first feedback resistor 74 are coupled in series between the inverse input terminal and the output terminal of the third operational amplifier 68. The second feedback resistor 76 is coupled in parallel to the series circuit of the feedback capacitor 72 and the first feedback resistor 74.

The inverse input terminal of the third operational amplifier 68 is coupled to the connection node between the first and second adder resistors 64 and 66. The non-inverse input terminal of the third operational amplifier 68 is coupled to both the reference potential source 52 and the tracking error detection circuit 14 (see FIG. 2). The non-inverse input terminal and the reference potential source 52 are coupled through a resistor 78. The non-inverse input terminal and the tracking error detection circuit 14 are coupled through the second unit switch 16B.

The output of the third operational amplifier 68, i.e., the integration compensation circuit 24 is applied to the pickup transfer motor 28 through the drive amplifier 26. The pickup transfer motor 28 comprises a drive coil 80 for moving the pickup 10 (see FIG. 2).

The second unit switch 16B is turned OFF in the data search mode by the system controller 18, as described before. Thus, the tracking error signal $S_1$ from the tracking error signal detection circuit 14 (see FIG. 2) is prohibited from being introduced into the pickup drive system 22 in the data search mode.

The nonlinear attenuator 40 comprises a pair of diodes 82 and 84, an attenuator resistor 86 and the first and second adder resistors 64 and 66 of the adder 20. The pair of diodes 82 and 84 and the attenuator resistor 86 are coupled in parallel with each other. In the parallel circuit, the pair of diodes 82 and 84 are coupled in the opposite directions. The parallel circuit of the three elements 82, 84 and 86 is coupled between the detection coil 42 of the pickup transfer sped detector 30 and the second adder resistor 66 of the adder 20.

Each of the diodes 82 and 84 has a threshold voltage Vth. The attenuator resistor 86 has a large resistance $R_{86}$ in comparison to the resistances $R_{64}$ and $R_{66}$ of the first and second adder resistors 64 and 66.

A pickup transfer speed signal $S_2$ having an absolute value higher than the threshold voltage Vth passes through one of the diodes 82 and 84 and the adder resistor 66. The attenuation output voltage $V_1$ of the nonlinear attenuator 40 in the above case is given by the following Equation (1).

$$V_1 = S_2 \cdot R_{66}/(R_{64}+R_{66}) \tag{1}$$

Equation (1) shows that attenuation output voltage $V_1$ is relatively small. In other words, the pickup transfer speed signal $S_2$ is greatly attenuated by the attenuator resistor 86.

A pickup transfer speed signal $S_2$ having an absolute value lower than the threshold voltage Vth passes through the attenuator resistor 86 and the adder resistor 66. The attenuation output voltage $V_2$ in this case is given by the following Equation (2).

$$V_2 = S_2 \cdot (R_{66} + R_{86}) / (R_{64} + R_{66} + R_{86}) \quad (2)$$

Here it is assumed that the resistance $R_{86}$ of the attenuator resistor 86 is much larger than the resistances $R_{64}$ and $R_{66}$ of the first and second adder resistors 64 and 66. Then, Equation (2) is modified to the following Equation (3).

$$V_2 = S_2 \cdot R_{66} / R_{86} = S_2 \quad (3)$$

Equation (3) shows that attenuation output voltage $V_2$ is equal to the original voltage of the pickup transfer speed signal $S_2$. In other words, the low level pickup transfer speed signal $S_2$ passes through the nonlinear attenuator 40 without any attenuation.

The target location indicating voltage generator 36 comprises a digital-to-analog converter (referred as D/A converter). The system controller 18 applies to the D/A converter 36 digital data corresponding to the distance between the present location of the pickup 10 and the target track location. The D/A converter 36 converts the digital data to the target location indicating voltage Vt. The target location indicating voltage Vt is applied to the non-inverse input terminal of the second operational amplifier 54 in the comparator 38.

The data reading device of FIG. 4 optionally includes a voltage range detector 88. The voltage range detector 88 is coupled between the pickup transfer speed detector 30 and the system controller 18. The voltage range detector 88 comprises a pair of fourth and fifth operational amplifiers 90 and 92 and an OR gate 94.

The non-inverse input terminal of the fourth operational amplifier 90 is coupled to the detection coil 42 of the pickup transfer speed detector 30. The inverse input terminal of the fourth operational amplifier 90 is coupled to a prescribed positive voltage source 96. Thus, the fourth operational amplifier 90 judges whether a pickup transfer speed signal $S_2$ having a positive voltage is below the prescribed positive voltage $+E_1$ or not.

The inverse input terminal of the fifth operational amplifier 92 is coupled to the detection coil 42 of the pickup transfer speed detector 30. The non-inverse input terminal of the fifth operational amplifier 92 is coupled to a prescribed negative voltage source 98. Thus, the fifth operational amplifier 92 judges whether a pickup transfer speed signal $S_2$ having a negative voltage is above the prescribed negative voltage $-E_1$ or not.

Both output terminals of the fourth and fifth operational amplifiers 90 and 92 are coupled to input terminals of the OR gate 94. Thus, the voltage range detector 88 judges whether the absolute value of the pickup transfer speed signal $S_2$ is below the voltage $E_1$ or not. The output of the voltage range detector 88 is applied from the output terminal of the OR gate 94 to the system controller 18. The system controller 18 performs a suitable control for the data reading device, e.g., a speed dumping ratio control for the pickup drive system 22.

Figure 5:
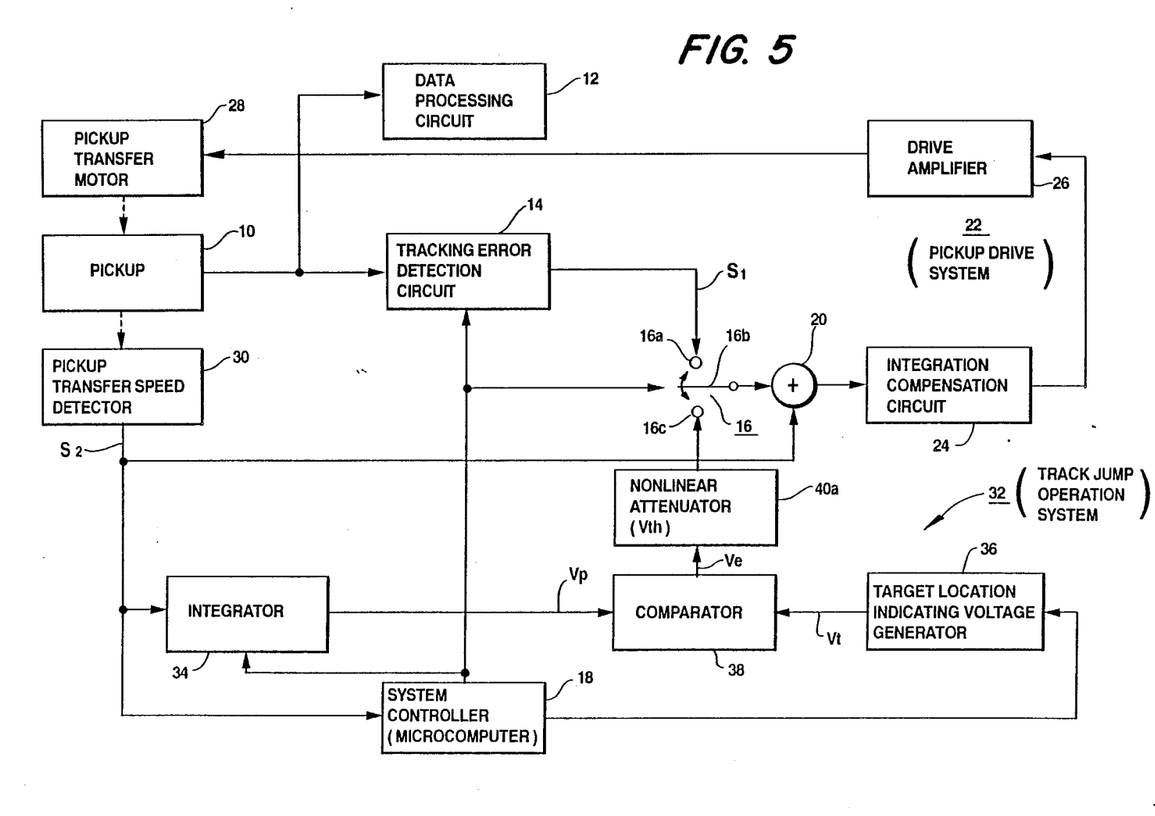
FIG. 5 is a block diagram showing a second embodiment of a data reading device for use of a disc player according to the present invention.
Figure 6:
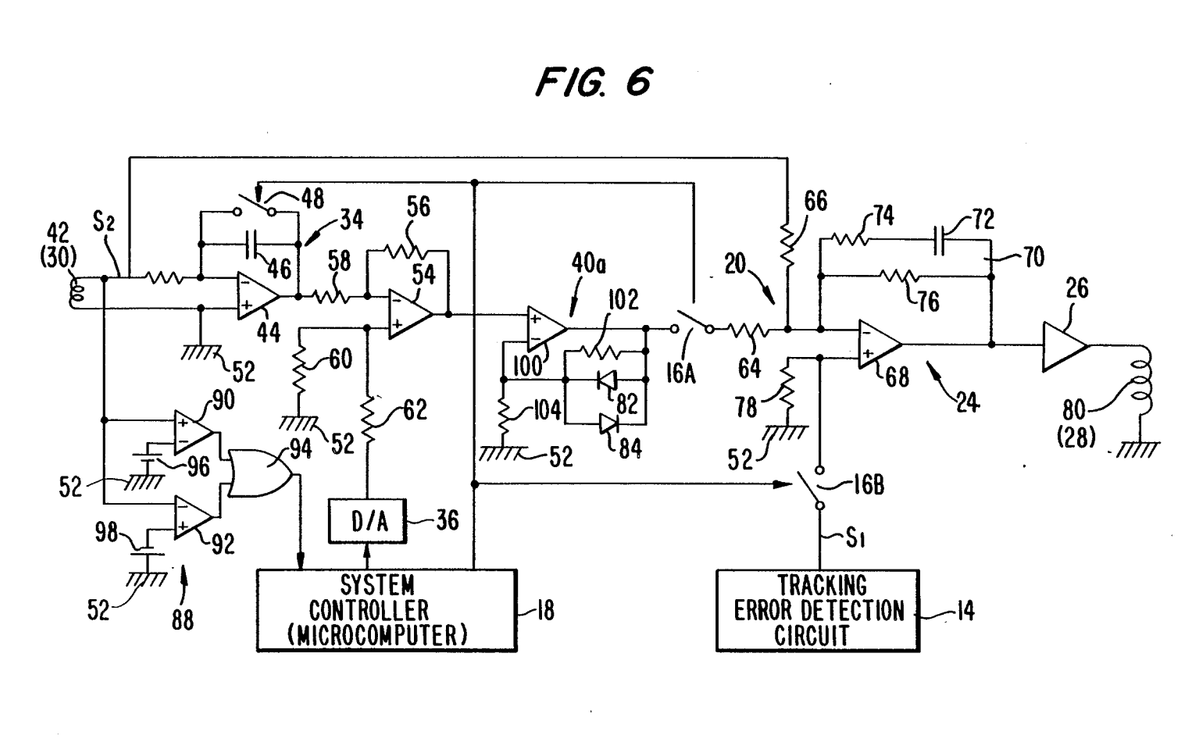
FIG. 6 is a schematic circuit diagram showing a practical circuit arrangement for a part of the data reading device of FIG. 5, which is assigned for the data search operation.

Referring now to FIGS. 5 and 6, a second embodiment of a data reading device for a disc player according to the present invention will be described. FIG. 5 is a block diagram showing the second embodiment of a data reading device. FIG. 6 is a diagram showing the practical circuit arrangement embodying a part of the data reading device of FIG. 5, which is assigned for the data search operation.

As shown in FIG. 5, the second embodiment of the data reading device is different from the first embodiment of the data reading device in that the nonlinear amplifier 40a is coupled between the comparator 38 and the mode switch 16. The remainders of the second embodiment of the data reading device is the same as those of the first embodiment of the data reading device. Thus, the second embodiment of the data reading device will be described only with respect to the different portion for simplicity of explanation.

In FIG. 5, the nonlinear amplifier 40a is coupled between the comparator 38 and the mode switch 16, as described above. Thus, the nonlinear amplifier 40a selectively amplifies the error voltage Ve obtained by the comparator 38. When the error voltage Ve is higher than a prescribed threshold voltage Vth', the nonlinear amplifier 40a amplifies the error voltage Ve. On the other hand, the nonlinear amplifier 40a transmits the error voltage Ve therethrough with a small degree of amplification or no amplification when the voltage level of the error voltage Ve is lower than the threshold level Vth. The error voltage Ve passing through the nonlinear amplifier 40a is then introduced into the pickup drive system 22 through mode selector 16 and the adder 20. The error voltage Ve introduced into the pickup drive system 22 operates to accelerate the transfer movement of the pickup 10.

At the beginning of the data search operation, the error voltage Ve, having a relatively high level in response to the distance between the location of the pickup 10 at the beginning of the data search operation and the target location, is introduced into the pickup drive system 22. The high level error voltage Ve is further amplified by the nonlinear amplifier 40a. Thus, the transfer speed of the pickup 10 at the beginning of the data search operation is accelerated. This causes the pickup 10 to move at a prescribed accelerated speed toward the target track. Thus, the pickup 10 can rapidly approach the target track.

When the pickup 10 reaches a position close to the target track at a prescribed extent, the error voltage Ve decreases below the threshold voltage Vth. The nonlinear amplifier 40a passes the low level error voltage Ve with little or no amplification. The non-amplified error voltage Ve is then introduced into the pickup drive system 22. The non-amplified error voltage Ve fails to accelerate the movement of the pickup 10. Thus, the pickup 10 is rapidly converged to the target track without overruning the target track.

Referring now to FIG. 6, a practical circuit arrangement of the data reading device of FIG. 5 will be explained. FIG. 6 is a schematic circuit diagram showing a practical circuit arrangement for a part of the data reading device of FIG. 5, which is assigned for the data search operation.

Similar to FIG. 5, the circuit arrangement of FIG. 6 is different from the first embodiment of the data reading device in that the nonlinear amplifier 40a is coupled between the comparator 38 and the mode switch 16. The remaining portions of the second embodiment of the data reading device are the same as those of the first embodiment of the data reading device. Thus, the circuit arrangement of FIG. 6 will be described only with respect to the different portion for the simplicity of explanation.

The nonlinear amplifier 40a comprises a sixth operational amplifier 100, a pair of diodes 82 and 84, a first feedback resistor 102 and a second feedback resistor 104. The non-inverse input terminal of the sixth operational amplifier 100 is coupled to the comparator 38. The inverse input terminal thereof is coupled to the reference potential source 52 through the second feedback resistor 104. The pair of diodes 82 and 84 and the first feedback resistor 102 are coupled in parallel. In the parallel circuit, the pair of diodes 82 and 84 are coupled in the opposite directions. The parallel circuit of the three elements 82, 84 and 102 is coupled between the output terminal of the sixth operational amplifier 100 and the inverse input terminal thereof.

Each of the diodes 82 and 84 has the threshold voltage Vth. The first feedback resistor 102 has a large resistance $R_{102}$ in comparison to the resistance $R_{104}$ of the second feedback resistor 104.

When an error voltage Ve having a higher absolute value than the threshold voltage Vth is applied to the non-inverse input terminal of the sixth operational amplifier 100, the output of the sixth operational amplifier 100 flows through one of the diodes 82 and 84 and the second feedback resistor 104. In this case, the sixth operational amplifier 100 presents a relatively high degree of amplification. Thus, the amplified error voltage Ve is introduced into the pickup drive system.

When an error voltage Ve having a lower absolute value than the threshold voltage Vth is applied to the non-inverse input terminal of the sixth operational amplifier 100, the output of the sixth operational amplifier 100 flows through the first and second feedback resistors 102 and 104. In this case, the sixth operational amplifier 100 presents a relatively low degree of amplification or no amplification. Thus, the non-amplified error voltage Ve is introduced into the pickup drive system.

As described above, the present invention can provide an extremely preferable data reading device for a disc player.

While there has been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example for the purposes of a dividual application.

What is claimed is:

1. A data reading device for use in a disc player comprising:

pickup means for reading data from a disc;
   means for moving said pickup means across said disc in a radial direction in response to to a speed control signal;
   means for detecting the radial speed of said pickup means and generating a speed signal representative of said speed;
   means for generating a position signal corresponding to a desired radial position on said disc;
   means for calculating the location of said pickup means with respect to said disc and generating a location signal corresponding to said location;
   means for generating a distance signal representing the distance between the location of said pickup means and said desired position using said position signal and said location signal;
   nonlinear attenuation means for attenuating said speed signal in a nonlinear manner based upon the value of said speed signal; and
   means for generating said speed control signal from said distance signal and said attenuated speed signal and applying said speed control signal to said means for moving said pickup means.

2. The data reading device of claim 1, wherein the nonlinear attenuation means acts to provide a first level of attenuation to said speed signal when said signal is above a preset amount, and to provide a second level of attenuation to said speed signal when said signal is below said preset amount.

3. The data reading device of claim 2, wherein said first level of attenuation is greater than said second level of attenuations.

4. A data reading device for use in a disc player comprising:

pickup means for reading data from a disc;
   means for moving said pickup means across said disc in a radial direction in response to to a speed control signal;
   means for detecting the radial speed of said pickup means and generating a speed signal representative of said speed;
   means for generating a position signal corresponding to a desired radial position on said disc;
   means for calculating the location of said pickup means with respect to said disc and generating a location signal corresponding to said location;
   means for generating a distance signal representing the distance between the location of said pickup means and said desired position using said position signal and said location signal;
   nonlinear amplifying means for amplifying said distance signal in a nonlinear manner based upon the value of said distance signal; and
   means for generating said speed control signal from said amplified distance signal and said speed signal and applying said speed control signal to said means for moving said pickup means.

5. The data reading device of claim 4, wherein the nonlinear amplification means acts to provide a first level of amplification to said distance signal when said signal is above a preset amount, and to provide a second level of amplification to said distance signal when said signal is below said preset amount.

6. The data reading device of claim 5, wherein said first level of amplification is greater than said second level of amplifications.

7. A method of moving pickup means from a first position to a second position on a disc, comprising the steps of:
- generating a first signal representative of the first position on said disc;
- generating a second signal representative of the second position on said disc;
- generating a distance signal which represents the distance between said first and second positions using said first and second signals;
- generating a speed signal which represents the radial speed of said pickup means across said disc;
- attenuating said speed signal in a nonlinear attenuator;
- generating a control signal from said attenuated speed signal and said distance singal; and
- using said control signal to control the movement of said pickup means across said disc.

8. A method of claim 7, wherein said attenuation is at one level if said speed signal is above a preset level, and is at a second level if said speed signal is below the preset level.

9. A method of claim 8, wherein said first level of attenuation is greater than said second level of attenuation.

10. A method of moving pickup means from a first position to a second position on a disc, comprising the steps of:
- generating a first signal representative of the first position on said disc;
- generating a second signal representative of the second position on said disc;
- generating a distance signal which represents the distance between said first and second positions using said first and second signals;
- generating a speed signal which represents the radial speed of said pickup means across said disc;
- amplifying said distance signal in a nonlinear amplifier;
- generating a control signal from said amplified distance signal and said speed signal; and
- using said control signal to control the movement of said pickup means across said disc.

11. A method of claim 10, wherein said amplification is at one level if said speed signal is above a preset level, and is at a second level if said speed signal is below the preset level.

12. A method of claim 11, wherein said first level of amplification is greater than said second level of amplifications.

* * * * *

UNITED STATES PATENT AND TRADEMARK OFFICE
CERTIFICATE OF CORRECTION

PATENT NO. : 4,937,803

DATED : June 26, 1990

INVENTOR(S) : Hiroshi Nakane

It is certified that error appears in the above-identified patent and that said Letters Patent is hereby corrected as shown below:

Claim 7, column 15, line 16, "singal" should be --signal--.

Signed and Sealed this

Twenty-second Day of September, 1992

*Attest:*

DOUGLAS B. COMER

*Attesting Officer*         *Acting Commissioner of Patents and Trademarks*